United States Patent [19]

Van Doorn

[11] 3,810,256

[45] May 7, 1974

[54] TRANSISTOR AMPLIFIER FOR BROAD-BAND INFORMATION SIGNALS

[75] Inventor: Willem Van Doorn, Hilversum, Netherlands

[73] Assignee: U.S. Philips Corporation, New York, N.Y.

[22] Filed: Feb. 28, 1973

[21] Appl. No.: 336,623

[30] Foreign Application Priority Data

Mar. 17, 1972 Netherlands ........................ 7203557

[52] U.S. Cl. .................... 330/28, 330/126, 330/149, 330/151

[51] Int. Cl. .............................................. H03f 1/08

[58] Field of Search ............. 330/28, 149, 126, 151; 328/162; 325/475, 476

[56] References Cited

UNITED STATES PATENTS 3,525,052 8/1970 Clark .................................. 330/149

*Primary Examiner*—Herman Karl Saalbach

*Assistant Examiner*—James B. Mullins

*Attorney, Agent, or Firm*—Frank R. Trifari; Henry I. Steckler

[57] ABSTRACT

A broad-band transistor amplifier comprising a negative feedback circuit for maximum negative feedback as well as a circuit with which in the manner of a negative feedback exclusively the distortion products occurring in the output signal of the amplifier are subjected to a feedback for the purpose of additionally reducing these distortion products. To this end the transistor amplifier includes a cascade arrangement of two impedances whose common connection point is connected to the input of a phase inverter stage which injects the distortion products in phase opposition into the output circuit of the amplifier.

10 Claims, 1 Drawing Figure

PATENTED MAY 7 1974 3,810,256
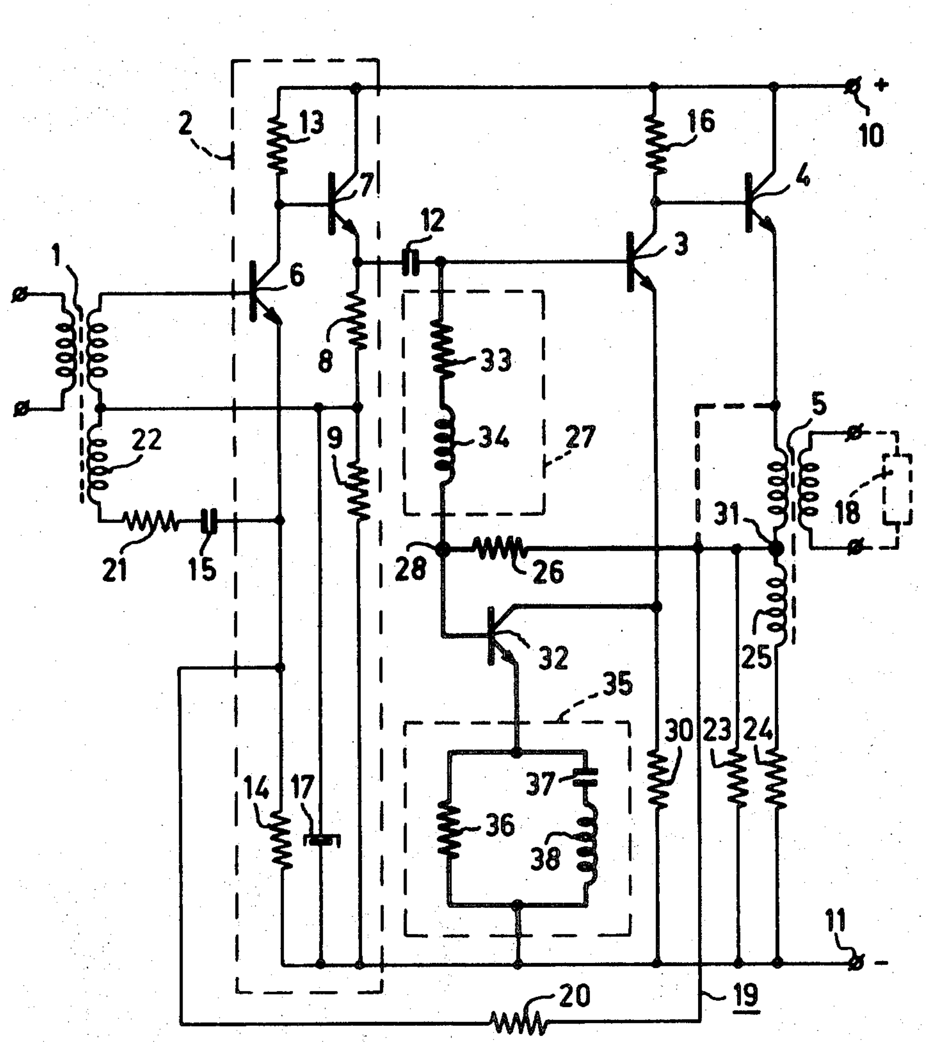

TRANSISTOR AMPLIFIER FOR BROAD-BAND INFORMATION SIGNALS

The invention relates to a transistor amplifier, particularly for amplifying broad-band information signals, comprising a pre-amplifier stage provided with a pre-amplifier output stage, the output signal derived from the emitter circuit of the transistor of the pre-amplifier output stage being applied to the base electrode of a transistor arranged in common emitter configuration and incorporated in a control amplifier stage for an amplifier end stage, said control amplifier stage following the preamplifier stage, said amplifier end stage being formed as a power amplifier stage and being constituted by a transistor arranged in common collector configuration, the output circuit of the transistor in the amplifier end stage being formed by the emitter circuit and being coupled at one end to a user and at the other end to a negative feedback circuit which is connected to the input of the pre-amplifier stage.

In carrier wave telephone systems, comprising a large number of cascade-arranged line repeaters, for example, several hundred for long distance broadband carrier wave telephone signal transmission, as regards signal distortion, very stringent requirements are imposed on these line repeaters. In fact, the distortion level must be below the internationally laid down limit value of 1.5 pW/km. In a modern carrier wave telephone system for the transmission of the carrier wave telephone signals in the frequency band of from 4 to 60 MHz over a distance of 4,000 kms and in which the line repeaters are placed at mutual distances of approximately 1.5 kms the level of the third order distortion introduced by each line repeater must be 120 dB below the level of the information signal, which level can no longer be achieved by increasing the negative feedback factor because the phase characteristic of the amplifier impose a maximum limit value on this negative feedback factor corresponding to a distortion level of approximately −100 dB. However, if it were attempted to further increase the negative feedback factor in order to further reduce the distortion level, this increase of the negative feedback factor to above its maximum permissible value will give rise to instabilities in the transistor amplifier.

In order to obtain a further reduction of the distortion to −120 dB under these circumstances solutions have been tried in linearizing the transistors used in the amplifier, by increasing the supply voltage and the supply currents. Besides a considerable increase of the supply power these steps detrimentally influence the reliability of the line repeaters.

An object of the invention is to provide a different conception of a transistor amplifier of the type described in the preamble in which without affecting both the reliability and the phase characteristic a considerable reduction of the distortion introduced by each transistor amplifier is obtained at the maximum permissible value of the negative feedback factor.

To this end the transistor amplifier according to the invention is characterized in that a potential divider whose potential divider point corresponds to the information signal zero point is provided between the emitter circuit of the transistor incorporated in the pre-amplifier output stage in common collector configuration and a connection point in the output of the transistor in the amplifier end stage having a phase-opposed information signal voltage, said transistor amplifier being furthermore provided with an amplifier stage operating as a phase inverter stage whose input is connected to the potential divider point of the potential divider and whose output is connected in the manner of a negative feedback circuit to an impedence in the emitter circuit of the transistor incorporated in common emitter configuration in the control amplifier stage.

The invention and its advantages will now be described in detail with reference to the FIGURE.

The FIGURE shows a line repeater for amplifying information signals, particularly carrier wave telephone signals located in the frequency band of from 4 to 60 MHz. These information signals are applied through an input transformer 1 for amplification to a cascade arrangement of a pre-amplifier stage 2, a control amplifier stage 3 and an amplifier end stage 4. The amplified carrier wave telephone signals are derived from the output transformer 5 which is incorporated in the output circuit of the amplifier end stage.

In the given embodiment the pre-amplifier stage 2 is constituted by an input stage 6 and an output stage 7. The bias for the base electrode of the transistor in the input stage 6 is derived from the central tap of a potential divider constituted by two resistors 8, 9 which are incorporated in the emitter circuit of the transistor 7. The resistor 9 is shunted for information signals by means of a capacitor 17. The cascade arrangement of transistor 7 and resistors 8 and 9 is connected between the positive terminal 10 and the negative terminal 11 of a voltage supply source. The carrier signals are applied to the base of the transistor 6 which transistor is furthermore provided with a collector resistor 13 and an emitter resistor 14. The information signals amplified in this input amplifier stage are derived from the collector resistor 13 and are applied to the transistor 7 operating as a pre-amplifier output stage. The information signals occurring at the emitter resistors 8, 9 are applied for further amplification through a coupling capacitor 12 to the control amplifier stage 3 which includes a transistor arranged in common emitter configuration, which transistor is provided with a collector resistor 16. The information signals occurring at the collector resistor 16 are applied for power amplification to the amplifier end stage 4 which is coupled through an output transformer 5 incorporated in its emitter circuit to a load impedance 18 constituted, for example, by the characteristic impedance of a section of a transmission line subsequent to the line repeater.

A negative feedback circuit 19 which produces a combined voltage and current negative feedback is provided between the amplifier end stage 4 and the preamplifier input stage 6. To this end the amplifier end stage 4 incorporates, between the primary winding of the output transformer 5 and the negative voltage terminal 11 of the voltage supply source, a series resistor 23 and also the series arrangement of a resistor 24 and a coil 25 coupled to the output transformer 5, while the end of the coil connected to the primary winding of the output transformer 5 is coupled to the base of the transistor 6 through a series arrangement of a feedback resistor 20, an isolation capacitor 15, a resistor 21 and a coil 22 coupled to the input transformer 1. The connection point between the feedback resistor 20 and the isolation capacitor 15 is also connected to the emitter electrode of the transistor 6.

At the maximum value of the negative feedback factor which, as described in the foregoing, is given by the phase characteristic, it was found that the distortion level could be reduced to −100 dB. In the given transistor amplifier having an amplification factor $\mu = 27$ dB at 60 MHz, the negative feedback factor $\beta = 22$ dB.

According to the invention the distortion introduced is further reduced to a considerable extent without influencing the stability of the line repeater because in the special embodiment of the transistor amplifier a potential divider constituted by two impedances 26, 27 whose potential divider point 28 corresponds to the information signal zero point is provided between the emitter electrode of the transistor incorporated in common collector configuration in the pre-amplifier output stage 7 and a connection point 31 in the output circuit of the transistor 4 in the amplifier end stage having a phase-opposed information signal voltage, while the transistor amplifier is furthermore provided with an amplifier stage 32 operating as a phase inverter stage whose input is connected to the potential divider point 28 and whose output is connected in the manner of a negative feedback circuit to an impedance 30 in the emitter circuit of the transistor 3 incorporated in common emitter configuration in the control amplifier stage. In the given embodiment said phase inverter stage 32 is constituted by a transistor arranged in common emitter configuration whose collector electrode is connected to the impedance 30 in the emitter circuit of the control amplifier stage 3, which impedance 30 is constituted by a resistor.

According to the invention the reduction in the distortion without affecting the stability of the line repeater is brought about because in the special embodiment of the transistor amplifier a special type of negative feedback, namely a distortion negative feedback is additionally provided across the control amplifier stage 3 and the amplifier end stage 4, which negative feedback is very effective for the distortion reduction because the distortions in the transistor amplifier are mainly brought about in the amplifier stages 3 and 4 of large power.

The output signals from the amplifier end stage 4, composed of the information signals as well as the distortion products mainly produced in the amplifier stages 3 and 4 are applied for this distortion negative feedback to one end of the potential dividers 26, 27 provided between the outputs of the amplifier end stage 4 and the preamplifier output stage. These output signals produce, however, a signal voltage of a negligible value in the output circuit of the pre-amplifier output stage 7 because the output impedance of the pre-amplifier output stage 7 arranged in common collector configuration is exceptionally low, for example, only a few ohms.

The output signals from the pre-amplifier output stage 7 which in addition to the information signal substantially do not contain any distortion products are applied in phase opposition to the other end of the potential divider 26, 27, while by suitable proportioning of the impedances 26 and 27 the information signals are compensated for in the potential divider point 28 so that exclusively the distortion products occur at this potential divider point 28 which products are utilized for the distortion negative feedback. Particularly these distortion products which are derived from the output of the amplifier end stage 4 are again injected into the transistor amplifier after amplification and phase inversion by the amplifier stage 32 and are applied without phase inversion and after amplification through the amplifier end stage 4 to the output transformer 5 via the control amplifier stage whose transistor 3 constitutes an amplifier in common base configuration for the re-injected distortion products.

A considerable reduction of the distortion products produced in the amplifier stages 3 and 4 was realized with the described negative feedback loop constituted by the potential divider 26, 27, the amplifier stage 32, the control amplifier stage 3 and the amplifier end stage 4, and the stability of the transistor amplifier fed back by means of the negative feedback circuit 19 was not noticeably influenced which can be ascribed to the fact that a very effective mutual decoupling is realized between the negative feedback circuit 19 and the distortion negative feedback. More particularly, no noticeable information signal voltage is introduced in the amplifier cascade through the potential divider 26, 27 as a result of the exceptionally low output impedance of the pre-amplifier output stage 7 formed as a common collector circuit and in the second place no information signals but distortion products are injected into the amplifier cascade through the amplifier stage 32, while finally the amplifier stage 32 does not affect the satisfactory operation of the amplifier cascade in any way because the output impedance of the amplifier stage 32 operating as a phase inverter stage is incomparably much larger than the input impedance of the amplifier stage 3 in which the transistor is arranged in common base configuration for the distortion products.

Without influencing the stability of the total transistor amplifier the realized mutual decoupling of the two negative feedbacks results in the remarkable effect that the maximum distortion reduction at the maximum negative feedback factor of the negative feedback circuit 19 can be increased to a considerable extent; for example, in the given embodiment the distortion level at the maximum negative feedback factor of the negative feedback circuit 19 was reduced from −100 dB to less than −120 dB. The reliability of the transistor amplifier is not affected in any way by this remarkable distortion reduction, while the stability as well as the simplicity in structure is maintained by using the steps according to the invention.

According to a further elaboration of the transistor amplifier described so far it is found that it is advantageous for realizing optimum results in case of amplification of the broadband information signals to ensure at the potential divider point 28 of the potential divider 26, 27 a satisfactory compensation throughout the frequency band of the information signals which especially towards the higher frequencies undergo phase shifts due to the transistor capacitances control amplifier stage 3 and the amplifier end stage 4. For this purpose the potential divider 26, 27 is formed as a frequency-dependent potential divider, end this in a very simple manner; particularly the impedance 26 located between the potential divider point 28 and the output of the amplifier end stage 4 is constituted by a resistor and the impedance 27 located between the potential divider point 28 and the output of the preamplifier output stage 7 is constituted by the series arrangement of a resistor 33 and an inductor 34.

Instead of proportioning the potential divider 26, 27 in such a manner that the information signals are compensated for at the potential divider point 28 for very high frequencies, it is simpler to reduce the loop gain for the distortion negative feedback to these high frequencies with the aid of a negative feedback circuit incorporated in the emitter circuit of the amplifier stage 32 and consisting of a resistor 36 and a series arrangement of a high value capacitor 37 and a low value inductor 28 connected in parallel with this resistor, which inductor may be constituted by the wiring inductor. This step may be used without any objection because, as already previously stated, the amplifier stage 32 does not affect the satisfactory operation of the transistor amplifier.

It is to be noted in this respect that it is alternatively possible to connect the potential divider 26, 27 not only to the connection point of the negative feedback circuit 19 in the output of the amplifier end stage 4, but also to the emitter electrode of the amplifier end stage as is shown by a broken line in the FIGURE.

The following data are mentioned below for a transistor amplifier as shown in the FIGURE and as extensively tested in practice:

Resistor 8 : 560 Ohms.
Resistor 9 : 464 Ohms.
Capacitor 17: 10 nF.
Resistor 30: 48.7 Ohms.
Resistor 26: 681 Ohms.
Resistor 33: 150 Ohms.
Inductor 34: 0.56 $\mu$H.
Resistor 36: 115 Ohms.
Capacitor 37: 680 pF.
Inductor 38 : 20 nH.

What is claimed is:

1. A transistor amplifier for amplifying a supplied information signal and comprising a pre-amplifier stage including, an input for receiving said signal, a common collector pre-amplifier output stage, the output signal derived from the emitter circuit of the transistor of the pre-amplifier output stage being applied to the base electrode of a transistor arranged in common emitter configuration and incorporated in a control amplifier stage for an amplifier end stage, said control amplifier stage following the pre-amplifier stage; said amplifier end stage being formed as a power amplifier stage and being constituted by a transistor arranged in common collector configuration, the output circuit of the transistor in the amplifier end stage being constituted by the emitter circuit and being coupled at one end to a load and at the other end to a negative feedback circuit which is also connected to the input of the pre-amplifier stage, characterized in that a potential divider whose potential divider point corresponds to the information signal zero point is connected between the emitter circuit of the transistor incorporated in common collector configuration in the pre-amplifier output stage and a connection point in the output of the common collector transistor in the power amplifier end stage having a phase-opposed information signal voltage, said transistor amplifier being furthermore provided with an amplifier stage operating as a phase inverter stage whose input is connected to the potential divider point of the potential divider and whose output is connected in the manner of a negative feedback circuit to an impedance in the emitter circuit of the transistor incorporated in common emitter configuration in the control amplifier stage.

2. A transistor amplifier as claimed in claim 1, characterized in that the potential divider is connected to the connection point of the output circuit of the amplifier end stage and the negative feedback circuit which is connected to the input of the pre-amplifier stage.

3. A transistor amplifier as claimed in claim 1, characterized in that the potential divider is constituted by a resistor incorporated between the potential divider point and the output of the amplifier end stage and by a series arrangement of a resistor and an inductor incorporated between the potential divider point and the output of the pre-amplifier output stage.

4. A transistor amplifier as claimed in claim 1, characterized in that the amplifier stage also operating as a phase inverter stage is constituted by a transistor arranged in common emitter configuration whose base is connected to the potential divider point of the potential divider and whose collector is connected to the said impedance in the emitter circuit of the control amplifier stage.

5. A transistor amplifier as claimed in claim 4, characterized in that the emitter circuit of the transistor incorporated in common emitter configuration in the phase inverter stage includes a frequency-dependent negative feedback circuit constituted by a resistor and a series arrangement of a capacitor and an inductor connected in parallel with said resistor, said frequency-dependent negative feedback circuit reducing the amplification of the phase inverter stage for frequencies located outside the operating range of the amplifier.

6. A circuit for amplifying an input information signal comprising an input section having an input means for receiving said input signal and an output means having a selected output impedance; an output amplifier section having a first input means coupled to said input section output means, a second input means having a selected input impedance, and an output means for supplying an amplified input signal to a load; a first negative feedback loop coupled between said input section input means and said output section output means; a second negative feedback loop comprising a potential divider coupled between said input section output means and said output section output means, said divider having an input impedance substantially greater than said input section output means impedance and a potential divider point means at a zero potential information signal for supplying a distortion signal from said output section and an output means coupled to said output section second input means and having an output impedance substantially greater than said output section second input means impedance for applying said distortion signal in a phase polarity to cancel the distortion in said output section; whereby said second feedback loop does not cause information signal feedback and the loops are mutually decoupled.

7. A circuit as claimed in claim 6 wherein said output section output means comprises a common point and said first and second feedback loops are coupled to said common point.

8. A circuit as claimed in claim 6 wherein said divider comprises a resistor coupled to said output section output means and a series circuit coupled between said resistor and said input stage output means and comprising a resistor and an inductor.

9. A circuit as claimed in claim 6 wherein said output amplifier section comprises a transistor control amplifier having a base and said second loop comprises a common emitter phase inverter transistor amplifier having a base coupled to said potential divider point and a collector coupled to said control transistor emitter.

10. A circuit as claimed in claim 9 wherein said sections have an operating range, and further comprising means for reducing the amplification of said phase inverter transistor for frequencies outside said range comprising a frequency dependent negative feedback circuit coupled to said emitter of said phase inverter transistor and including a resistor and a series circuit parallel coupled to said resistor including a capacitor and an inductor.

* * * * *